Aug. 4, 1942.  R. H. SIMONDS  2,292,165
OPHTHALMIC MOUNTING
Filed Dec. 30, 1939  2 Sheets-Sheet 1
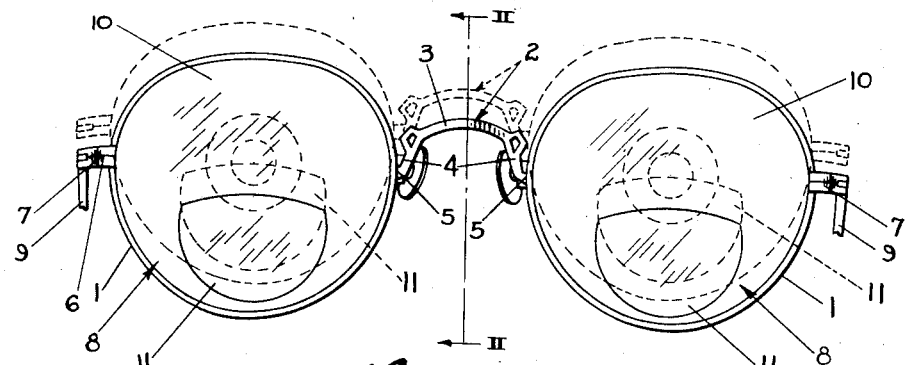
Fig. I
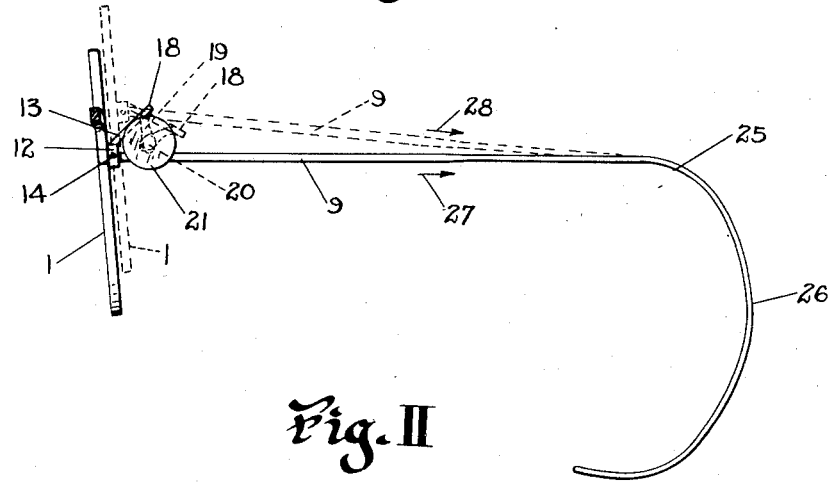
Fig. II
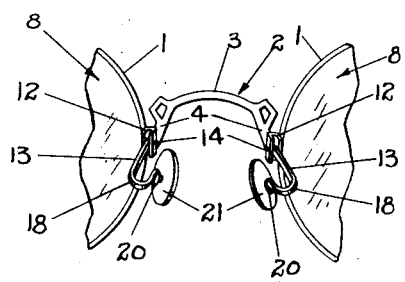
Fig. IV
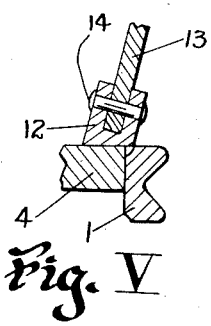
Fig. V
INVENTOR.
ROYAL H. SIMONDS.
BY
Harry H. Styll
ATTORNEY.

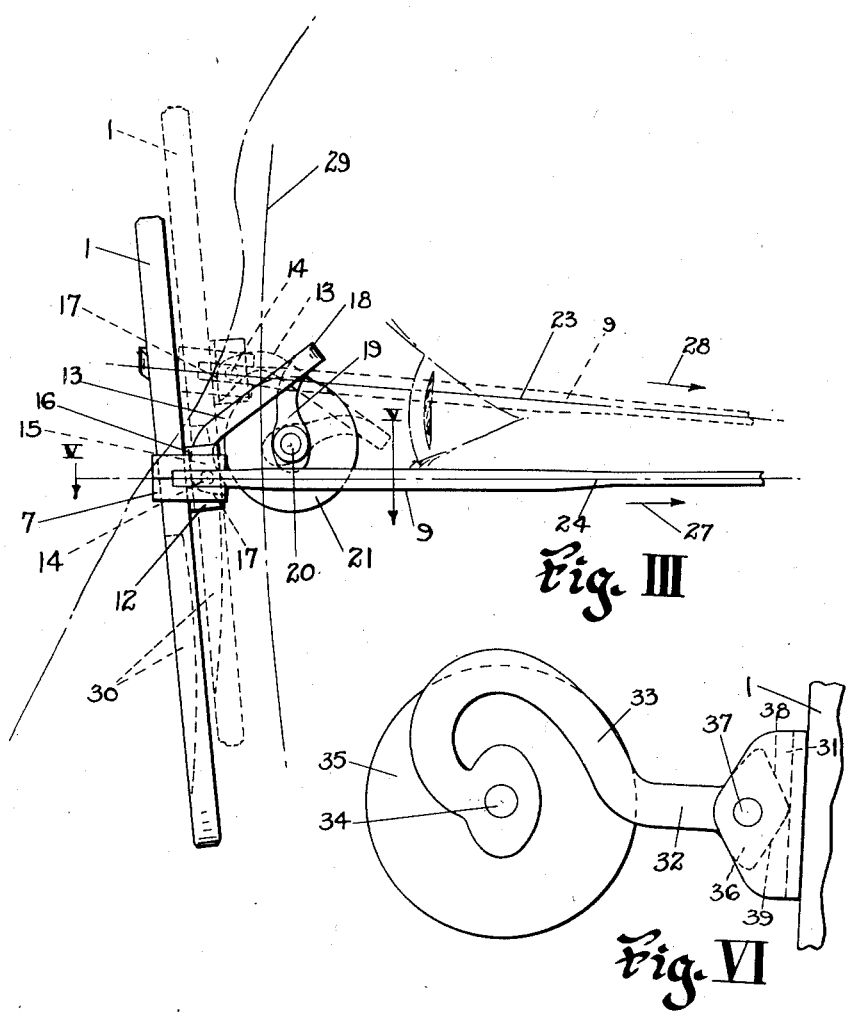

Patented Aug. 4, 1942

2,292,165

UNITED STATES PATENT OFFICE 2,292,165

OPHTHALMIC MOUNTING

Royal H. Simonds, Southbridge, Mass., assignor to American Optical Company, Southbridge, Mass., a voluntary association of Massachusetts Application December 30, 1939, Serial No. 311,911

4 Claims. (Cl. 88—49)

This invention relates to improvements in ophthalmic mountings and has particular reference to novel means of raising and lowering the position of the lenses of said mountings before the eyes.

One of the principal objects of the invention is to provide novel means of making an ophthalmic mounting for use with lenses having different focal fields whereby said focal fields may be moved upwardly or downwardly to different positions before the eyes.

Another object of the invention is to provide an ophthalmic mounting for use with multifocal lenses whereby the said lenses may be raised or lowered before the eyes so that each of the focal fields may be located in a comfortable position of use.

Another object is to provide a construction of the above character whereby the adjustable portions of the mounting will positively retain their different adjusted positions when the mounting is on the face.

Another object is to provide simple, automatic and positive functioning means for locating and retaining the lenses at different adjusted positions before the eyes.

Another object is to provide a simple, efficient and compact construction of the character described functioning in cooperative relation with the pull of the temples, which support the mounting on the face, for retaining the adjusted positions of said mounting on said face and which will yet afford ease and simplicity of adjustment.

Other objects and advantages of the invention will become apparent from following description taken in connection with the accompanying drawings and it will be apparent that many changes may be made in the details of construction and arrangement of parts shown and described without departing from the spirit of the invention as expressed in the accompanying claims. The invention, therefore, is not to be limited to the exact details of construction and arrangement of parts shown and described as the preferred forms only have been given by way of illustration.

Referring to the drawings:

Fig. I is a front elevation of the ophthalmic mounting embodying the invention showing the said mounting in different adjusted positions;

Fig. II is a sectional view taken as on line II—II of Fig. I showing the temple extended and illustrating the position of the parts at different adjustments;

Fig. III is an enlarged fragmentary side elevation of the mounting illustrating its different adjusted positions relative to the eyes when on the face of the wearer;

Fig. IV is a rear view of the mounting;

Fig. V is an enlarged sectional view taken as on line V—V of Fig. III;

Fig. VI is an enlarged fragmentary side elevation of a modified form of the invention.

The invention is directed particularly to the provision of an ophthalmic mounting for use with multifocal lenses, that is, lenses having at least a distance focal field and a reading focal field. It has been usual in the past with mountings having such lenses to so locate the different focal fields before the eyes so that the said eyes could look above the near vision or reading field for distance vision and yet have the said near vision fields so positioned that when looking downward, as when reading, the eyes would look through said near vision fields. The problem with this arrangement was that the positional relation of the different focal fields as required by different individuals greatly varied. With some, in order to obtain unobstructed distance vision the near vision focal fields had to be positioned relatively low on the lenses. This introduced the difficulty of causing the individual to have to abnormally tilt his head rearwardly in order to raise the near vision fields sufficiently to afford reading vision therethrough. If, on the other hand, the segments were located sufficiently high on the lenses to eliminate such abnormal back tilting of the head difficulty would be encountered in obtaining a wide field of distance vision without optical interference by said reading fields. Such conditions, in the past, have been exceedingly annoying and in many instances intolerable.

Many attempts have been made to provide a mounting whereby the lenses could be raised or lowered before the eyes so that the different focal fields could be moved into and out of desired position of use in order to afford a wide field of vision through said different focal fields.

The difficulty however with most prior constructions was that they were complicated structurally, difficult to operate and undesirable from the aesthetical viewpoint. The difficulty was that the constructions were such that they could not be formed sufficiently rigid and durable and yet be desirable from the aesthetical viewpoint and did not afford ease and simplicity of adjustment. The present invention therefore is directed particularly to the provision of an ophthalmic mounting so constructed as to overcome all of the difficulties set forth above through the provision of simple, durable and efficient means whereby the near vision fields of multifocal lenses may be quickly and easily raised or lowered as desired by a simple upward or downward movement of the mounting on the face without requiring any other adjustments and which is particularly desirable from the aesthetical viewpoint. The invention resides particularly in the provision of an ophthalmic mounting capable of the above adjustments and which will yet have the appearance of the usual prior art type mountings.

Referring more particularly to the drawings wherein like characters of reference designate like parts throughout the several views the invention broadly comprises a pair of lens holding rims 1 joined by a main supporting bridge member 2. The bridge member 2 may be any of the conventional types used in the ophthalmic art. In this particular instance the said bridge member comprises a central arch portion 3 and depending side portions 4. The said depending side portions 4 are joined with the lens rims 1 or other suitable lens holding means such as a conventional rimless lens strap as by soldering, welding or the like, as illustrated at 5. The lens rims 1 are divided, as illustrated at 6, and are provided with conventional connecting lugs 7 which are secured together by a screw or the like to hold the lenses 8 in the rims. The said lugs also afford connecting means to which suitable temples 9 are pivotally attached. The lenses 8, in this particular instance, comprise a distance field 10 and a reading field 11. Such lenses are commercially known as bifocal lenses but it is to be understood that the invention may be used with lenses having two or more focal fields as desired.

The central arch portion 3 and depending side portions 4 of the bridge are formed of material having sufficient rigidity so as to resist bending and distorting during the use of the mounting.

A pair of U-shaped members 12, as shown in Figs. II, III, IV and V, are secured to the rear of the depending portions 4 as by soldering, welding or the like and may be disposed in an outwardly diverging relation with each other as illustrated in Fig. IV. These members 12 provide pivot means to which nose pad supporting arms 13 are pivotally attached, as illustrated at 14. The arms 13, in this particular instance are provided with an angled end portion 15 which, as illustrated at 16, engages the bottom of the U-shaped member 12 to limit the upward pivotal movement of the arm 13 about the pivot 14. The lower end 17 of the angled portion 15 also functions as stop means for engaging the bottom of the U-shaped member 12 to limit the downward pivotal movement of the arm 13 as illustrated by the dash lines in Fig. III. The arms 13 extend rearwardly to adjustable loop portions 18 which terminate in forwardly and downwardly extending portions 19 having a pivotal connection 20 with the nose bearing pads 21. The nose bearing pads 21 in this particular instance are formed circular in contour so that rotation thereof about the pivotal connection 21 during the raising or lowering of the front of the mounting will not alter the fit of the pads with the sides of the nose of the wearer. The bearing points 16 and 17 of the angled portions 15 at the opposite sides of the pivots 14 are so controlled as to limit the upward and downward movement of the arms 13. When in a raised position, the arms 13 as illustrated in Figs. II and III are so disposed as to position the pivot 20 of the nose bearing pads 21 above the pivots 14 and when in a lowered position, as illustrated by the dash lines in Fig. III, will locate the pivots 20 below the pivots 14.

This control of the pivotal movement of the arms 13 is such as to locate the pivots 20 for the nose pads 21 above and below the line of pull of the temples as illustrated by the dot and dash lines 23 and 24. The line of pull passes substantially through bearing points 25 adjacent the upper joining points of the helix or margins of the ears to the head. The temples 9 are provided with resilient loop portions 26 which fit about the ear adjacent the head and the resiliency of the loops 26 functions in cooperative relation with the pivotal movement of the arms 13 to retain the lenses in an upward or downward direction.

For example, when the arms 13 are raised as illustrated by the full lines in Fig. III the pad pivots 20 move above the pivotal connections 14 of the arms 13 to the pivot members 12. The pull of the temples 9 along the line 24 and in the direction indicated by the arrow 27 tends to retain the arms 13 in a raised position. This is due to the fact that the pad pivots 20 are above the line of pull 24 so that stress in the direction of the arrow 27 tends to urge said arms 13 in a direction upwardly about the pivots 14. The stop members 16 limit this upward movement. It is also pointed out that when the arms 13 are at a raised position, as illustrated in full lines in Fig. III, the action of gravity on the lenses will also tend to retain the arms 13 in a raised position. When the arms 13 are lowered, as illustrated by the dash lines in Fig. III, the pad pivots 20 will move below the pivots 14 and below the line of pull 23. Stress in the direction of the arrow 28 along said line 23 will tend to cause the arms 13 to be moved in an outward direction about the pivots 14 and will thereby retain the lens rims 1 and lenses therein in a raised position such as shown by the dash lines. To shift the position, it is merely necessary to grasp the sides of the lens rims or lenses so as to move said lenses in an upward or downward direction. Movement in either direction sufficient to overcome the resilient stress of the loops 26 of the temples will cause the lenses to move upwardly or downwardly depending upon the direction of movement of the temples by the hand. It is particularly pointed out that the pad pivots 20 move a considerably greater distance below the pivots 14 when the arms 13 are in a downward direction than the said pad pivots 20 move when the said arms 13 are in a raised position. The reason for this is that a greater leverage is obtained by allowing the pad pivots to move a relatively great distance below the pad supporting pivots 14 so that the resilient pull of the temples may be such as to maintain a comfortable fit with the ears of the wearer and yet afford sufficient resilient stress to permanently retain the lens rims and lenses in a raised position. The pad pivots 20 when the arms 13 are in a downward direction are located at a point adjacent the line 29 of gravital swing of the mounting about the bearing points 25 so that the action of gravity which might tend to cause the pads 21 to move upwardly about the pivots 14 is substantially nullified.

The reading fields of the lenses are diagrammatically illustrated by dash lines at 30 in Fig. III. The arms 13 are provided with loop portions 18 so as to afford a relatively wide range of adjustment for fitting the pads to the sides of the nose of the wearer.

The intimate contact of the pads 21 with the flesh of the sides of the nose inherently tends to cause them to superficially adhere to the flesh during the adjustment of the mounting in a direction upwardly or downwardly so that the arms 13 will tend to rotate about the pivots 20 and also swing about the pivots 14 relatively freely during said adjustments whereby the said adjustments may be performed with maximum ease and without discomfort to the wearer.

In Fig. VI there is shown a slight modification wherein pivot members 31 simulating the pivot members 12 are secured to the rear of the lens rims 1. In this instance, the nose pad supporting arms 32 are provided with an upwardly curved bend to provide an adjustable portion. The said bent portions 33 extend downwardly and forwardly to pivotal connections 34 simulating the pivots 20. The nose bearing pads 35 in this instance are circular in contour similar to the bearing pads 21. The arms 32 are provided with an enlarged portion 36 through which the pivot pin 37 which pivotally connects said arm to the pivot member 31 extends. The said enlarged portions are provided with angled faces 38 and 39 which limit the upward and downward pivotal movement of the arms 32. The arms 32 otherwise function in a manner similar to the arms 13.

With the above construction, it is particularly pointed out that it is only the pad arms which shift their position when the front of the mounting is raised or lowered. The movement of the center of the pad arms above the pivotal connections 14 or those simulating said pivotal connections in combination with the resilient pull of the temples retains the said front of the mounting in its adjusted position. Movement of the front of the mounting upwardly so as to move the center points or pivots 20 of the pad arms below the pivots 14 in combination with the pull of the temples retains the front in the raised position. Due to the fact that the centers 20 are positioned adjacent the gravital curve line whose center is approximately at the bearing point 25 of the temples with the ears the gravital action on the front of the mounting will be substantially nullified, particularly gravital action which might tend to cause the said arms to rotate about the pivots 14. It is particularly pointed out, in connection with this substantially nullifying of the gravital action that when the arms or pads are in a downward position relative to the pivots 14, gravital action will cause the front of the mounting to be rotated about the bearing points 25 of the temples with the ears so that said gravital action will be in this direction. By placing the pivots 20 adjacent this gravital line and also the pivots 14 adjacent said gravital line the action of gravity which might tend to rotate the arms 13 about the pivots 14 will be substantially nullified. This, therefore, eliminates added strain which might be added on the ear gripping portions of the temples through the necessity of their having to overcome said gravital action. The pull of the temples may therefore be held within the limits of comfort to the wearer or no more than has been usual in the past.

It is to be noted that the means 12, to which the arms 13 are pivoted, may be connected to the rear of the lens rims, to the rear of the depending portions 4 of the bridge or may be connected partially to each. In each instance, however, the said pivot members 12 will be substantially concealed from view when the mounting is viewed from the front.

It is to be noted that in connection with the construction illustrated in Figs. I to III inclusive, when the front of the mounting is raised or lowered and the bearing pads are in engagement with the nose the said arms will move about the pivotal connections 20 with said pads without causing any twisting strain thereon.

From the foregoing description it will be seen that simple, efficient and economical means have been provided for accomplishing all of the objects and advantages of the invention.

Having described my invention, I claim:

1. A lens supporting structure for the lenses of an ophthalmic mounting comprising a pair of lens holding members, bridge means for supporting said lens holding members in spaced relation, slotted pivot bearings secured to said supporting structure, one adjacent each of the opposed sides of the bridge means with the slots, in one direction, being disposed substantially vertical and, in a direction substantially normal thereto, extending rearwardly in diverging relation with each other, said slotted pivot bearings having bearing surfaces internally of the slotted portions thereof, a pair of nose pad supporting arms each having a sidewise deflected forward end portion pivotally connected, intermediate said deflected end portion, internally of the respective slotted pivot bearings and with the said arms extending rearwardly thereof in diverging relation with each other and nose pads loosely supported by said rearwardly extending portions, said deflected forward ends of said nose pad supporting arms each having a side bearing face and an end bearing face forming stop portions on the opposed sides of the adjacent pivotal connection each adapted to engage the bearing surface internally of the slots for limiting the extent of the upward or downward pivotal movement of the nose pad supporting arms, said supporting structure embodying temple means pivotally supported adjacent the outer sides of the lenses and having resilient ear gripping portions for retaining the mounting on the face and being so associated with the outer sides of the lenses that the line of the pull introduced by the temples in retaining the mounting in position on the face will effectively pass through the pivotal connection of the nose pad supporting arms to the slotted pivot bearings whereby the pad supporting arms will be retained in a raised or lowered position with respect to said pivots and will be limited in their upward and downward movement about said pivots by engagement of the stop portions adjacent the ends of said arms with the bearing surface internally of the slotted pivot bearings.

2. An ophthalmic mounting comprising a pair of lenses and a lens supporting structure for said lenses, said supporting structure comprising a pair of lens holding members, bridge means for supporting said lens holding members in spaced relation, slotted pivot bearings secured to said supporting structure, one adjacent each of the opposed sides of the bridge means with the slots, in one direction, being disposed substantially vertical and, in a direction substantially normal thereto, extending rearwardly in diverging relation with each other, said slotted pivot bearings having bearing surfaces internally of the slotted portions thereof, a pair of nose pad supporting arms each having a sidewise deflected forward end portion pivotally connected, intermediate said deflected end portion, internally of the respective slotted pivot bearings and with the said arms extending rearwardly thereof in diverging relation with each other and nose pads loosely supported by said rearwardly extending portions, said deflected forward ends of said nose pad supporting arms each having a side bearing face and an end bearing face forming stop portions on the opposed sides of the adjacent pivotal connection each adapted to engage the bearing surface internally of the slots for limiting the extent of the upward or downward pivotal movement of the nose pad supporting arms, said supporting structure embodying temple means pivotally supported adjacent the outer sides of the lenses and having resilient ear gripping portions for retaining the mounting on the face and being so associated with the outer sides of the lenses that the line of the pull introduced by the temples in retaining the mounting in position on the face will effectively pass through the pivotal connection of the nose pad supporting arms to the slotted pivot bearings whereby the pad supporting arms will be retained in a raised or lowered position with respect to said pivots and will be limited in their upward and downward movement about said pivots by engagement of the stop portions adjacent the ends of said arms with the bearing surface internally of the slotted pivot bearings.

3. A lens supporting structure for the lenses of an ophthalmic mounting comprising a pair of lens holding members, bridge means for supporting said lens holding members in spaced relation, slotted pivot bearings secured to said supporting structure, one adjacent each of the opposed sides of the bridge means with the slots, in one direction, being disposed substantially vertical and, in a direction substantially normal thereto, extending rearwardly in diverging relation with each other, said slotted pivot bearings having bearing surfaces internally of the slotted portions thereof, a pair of nose pad supporting arms each having an angularly disposed forward end portion, said end portion being disposed in the direction of the vertical plane of the adjacent portion of the arm, adjacent the forward end thereof, said forward ends being pivotally connected, within the slots of the pivot bearings with the said arms extending rearwardly thereof in diverging relation with each other and nose pads supported by said rearwardly extending portions, said forward end portions of the nose pad supporting arms on the opposed sides of the adjacent pivotal connection, having abutting edges adapted to engage the bearing surfaces internally of the slots for limiting the extent of the upward or downward pivotal movement of the nose pad supporting arms, said supporting structure embodying temple means pivotally supported adjacent the outer sides of the lenses and having head engaging portions for retaining the mounting on the face whereby the pad supporting arms will be retained in a raised or lowered position with respect to said pivots and will be limited in their upward and downward movement about said pivots by engagement of the abutting edges adjacent the forward ends of said arms with the bearing surfaces internally of the slotted pivot bearings.

4. An ophthalmic mounting comprising a pair of lenses and a lens supporting structure for said lenses, said supporting structure comprising a pair of lens holding members, bridge means for supporting said lens holding members in spaced relation, slotted pivot bearings secured to said supporting structure, one adjacent each of the opposed sides of the bridge means with the slots, in one direction, being disposed substantially vertical and, in a direction substantially normal thereto, extending rearwardly in diverging relation with each other, said slotted pivot bearings having bearing surfaces internally of the slotted portions thereof, a pair of nose pad supporting arms each having an angularly disposed forward end portion, said end portion being disposed in the direction of the vertical plane of the adjacent portion of the arm, adjacent the forward end thereof, said forward end being pivotally connected, within the slot of the pivot bearing with the said arms extending rearwardly thereof in diverging relation with each other and nose pads supported by said rearwardly extending portions, said forward end portions of the nose pad supporting arms, on the opposed sides of the adjacent pivotal connection, having abutting edges adapted to engage the bearing surfaces internally of the slots for limiting the extent of the upward or downward pivotal movement of the nose pad supporting arms, said supporting structure embodying temple means pivotally supported adjacent the outer sides of the lenses and having head engaging portions for retaining the mounting on the face whereby the pad supporting arms will be retained in a raised or lowered position with respect to said pivots and will be limited in their upward and downward movement about said pivots by engagement of the abutting edges adjacent the forward ends of said arms with the bearing surfaces internally of the slotted pivot bearings.

ROYAL H. SIMONDS.